United States Patent
Aoki et al.

[11] 3,905,019
[45] Sept. 9, 1975

[54] PATTERN RECOGNIZING OPTICAL APPARATUS

[75] Inventors: Harumi Aoki; Masahide Inoue; Harumi Kawasaki, all of Tokyo, Japan

[73] Assignee: Asahi Kogaku Kogyo Kabushiki Kaisha, Tokyo, Japan

[22] Filed: Nov. 1, 1973

[21] Appl. No.: 411,673

[30] Foreign Application Priority Data
Nov. 2, 1972  Japan.............................. 47-110062

[52] U.S. Cl. ........................................ 340/146.3 P
[51] Int. Cl.² ........................................ G06K 9/08
[58] Field of Search............................. 340/146.3 P

[56] References Cited
UNITED STATES PATENTS

| | | | |
|---|---|---|---|
| 3,571,603 | 3/1971 | Bryant et al.................. | 340/146.3 P |
| 3,600,054 | 8/1971 | Gabor........................... | 340/146.3 P |

OTHER PUBLICATIONS

D. Gabor, Character Recognition by Holography, Photography Digest, Oct. 30, 1965, pp. 422–423, Vol. 208.

*Primary Examiner*—Joseph M. Thesz, Jr.
*Attorney, Agent, or Firm*—Steinberg & Blake

[57] ABSTRACT

A pattern recognizing apparatus having a spatial filter manufactured by exposing a surface of a hologram dry plate to a pair of light beams simultaneously directed to a point on the hologram dry plate surface with one of the light beams extending along an optical axis which is perpendicular to the surface while the other of the light beams makes a predetermined angle with respect to the optical axis. These light beams are directed through a mask which contacts the dry plate surface during exposure thereof to the light beams, this mask having a transmission function which will determine the function of the spatial filter formed by the hologram after it is developed subsequent to exposure thereof. A series of these masks which are respectively of different transmission functions are sequentially used during sequential exposures to the light beams where the light beam which makes an angle with the optical axis has different angles for the different exposures, so that in this way a multiple-point hologram is achieved. This spatial filter is then used in an optical reader where a photoelectric detecting structure is arranged along each of the axes along which the light beams which make an angle with the optical axis were directed during exposure of the dry plate.

7 Claims, 6 Drawing Figures

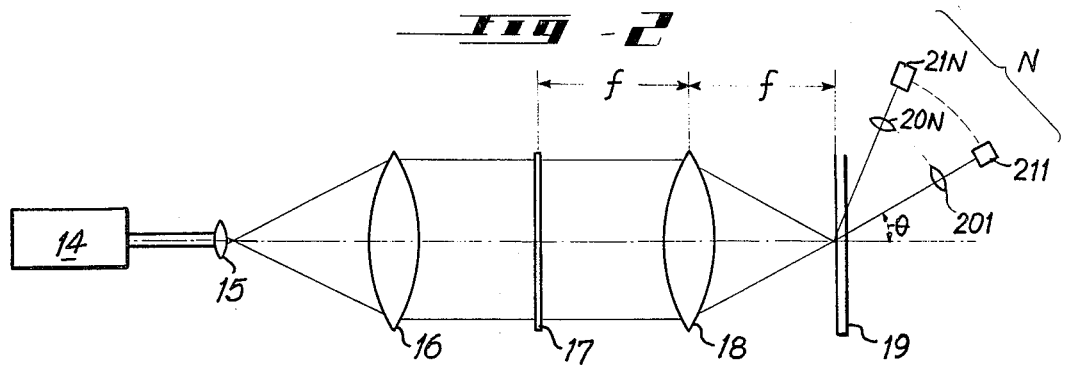
Fig-2
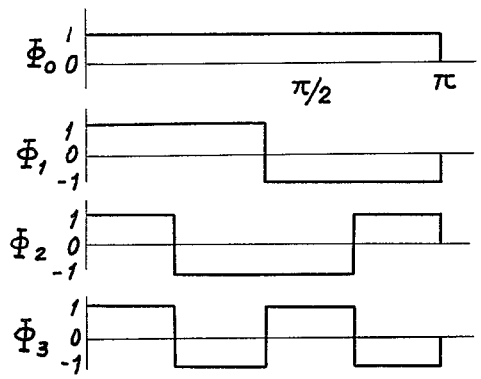
Fig-3
$$H_4 = \begin{bmatrix} + & + & + & + \\ + & + & - & - \\ + & - & - & + \\ + & - & + & - \end{bmatrix}$$
Fig-4
$\Phi_0 = \phi_1$
$\Phi_1 = \phi_2 - \phi_3$
$\Phi_2 = \phi_4 - \phi_5$
$\Phi_3 = \phi_6 - \phi_7$
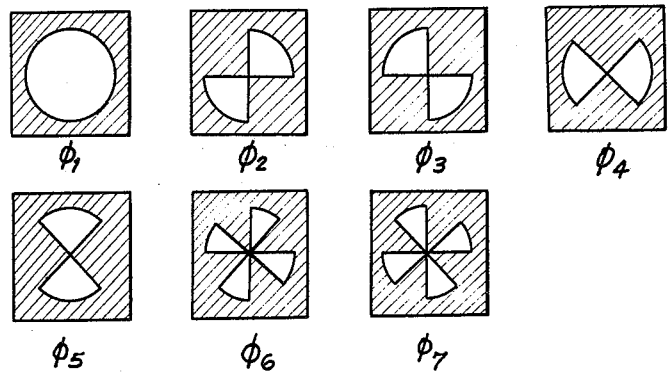
Fig-5

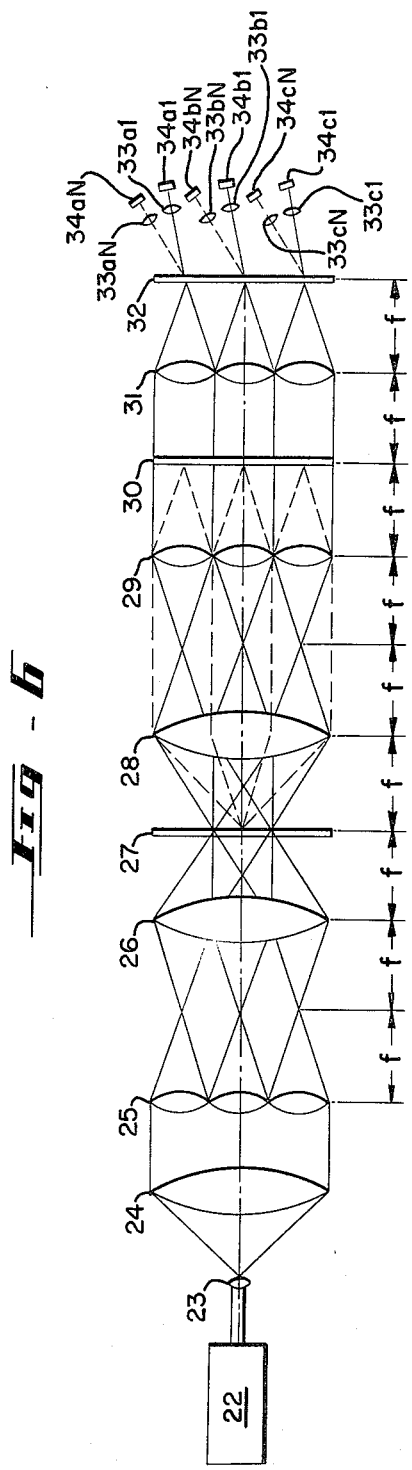

PATTERN RECOGNIZING OPTICAL APPARATUS

BACKGROUND OF THE INVENTION

The present invention relates to optical readers which are capable of identifying two-dimensional patterns, characters, or the like.

In particular, the invention relates to a light filtering apparatus utilizing a coherent light, the optical reader utilizing a spatial filter formed by a point hologram.

It is conventional to identify or recognize two-dimensional patterns such as characters by utilizing an optical character reader (referred to below as an OCR) while also utilizing light filtering with coherent light. Conventional devices of this type include a mechanism for extracting the characteristics which are inherent in the two-dimensional input patterns with additional mechanism being utilized in some cases to transform the extracted characteristics in order to increase the discrimination ratio between the patterns. In order to extract characteristic parameters from two-dimensional input patterns, several devices are known which are selectively used depending upon the pattern which is to be recognized.

In an OCR the optical system is conventionally used only for extracting direct characteristics from a two-dimensional pattern and in general includes several observation parameters. Since the subsequent procedures such as transformation and identification of the pattern characteristics are carried out by electronic circuit systems, the redundancy of the pattern information becomes excessively high and therefore such constructions are expensive and large. If it is desired to reduce the quantity of pattern information which is to be processed, it is essential to limit the patterns of specific characters.

On the other hand, known light-filtering procedures are capable of extracting characteristics of a two-dimensional input pattern in a spatial and parallel manner. Also, such light-filtering techniques have the capability of carrying out transformation of the characteristics of the input pattern. Spacial filters known for this purpose generally fall into two main classes, namely, filters which function only as an operator for processing the two-dimensional pattern information and matched filters functioning not only as an operator but also as a memory or storage unit. It is the function of the matched filter, in a pattern recognizing apparatus, to detect the correlation between the memorized pattern information and the input pattern as a characteristic parameter, so that the input pattern information may be processed in this way. This function of the matched filter is equivalent to the memory action and operation action for obtaining the correlative function, both of which have conventionally been carried out in the visible light region by utilizing an electronic computer associated with an OCR. The use of a matched filter does away with a large-sized memory and electronic circuit system, and it is therefore possible to provide a high-speed, inexpensive and compact two-dimensional pattern recognizing apparatus. However, utilizing the matched filter technique to recognize two-dimensional patterns is disadvantageous in that the characteristics of the input pattern are transformed into an optical correlative image (bright points) so that the pattern information is deficient in redundancy, thus rendering it difficult to effect discrimination between similar patterns.

Spatial filters (also referred to as optical operation spatial filters) other than matched filters operate only as operators for transforming the characteristics of two-dimensional input patterns. It is therefore possible to increase the redundancy of the input pattern information by suitably selecting the configuration of such filters. This latter capability is a decisive factor for the operating action of such filters. Most spatial filters of this type are located in the Fourier-transform spectrum plane of a two-dimensional pattern, because the Fourier transformation of the input pattern information will permit, due to its characteristics, extraction of the input pattern characteristics which are invariable with parallel shift of the input pattern in the Fourier-transform spectrum plane. Some known OCRs bring about this Fourier transformation with an electronic computer. On the other hand, with an optical system utilizing a coherent light, the characteristics of the input pattern can be easily extracted in an analog and spatial manner in the form of a Fraunhofer diffraction pattern for the two-dimensional input pattern. Optical operation spatial filters of this type may be classified into two categories. The first category includes discontinuous filters such as low-pass filters allowing only the passage of low spatial frequencies contained in the Fourier-transform spectrum distribution of the input pattern, high-pass filters allowing the passage only of high spatial frequencies, and band-pass filters allowing the passage of only a preselected spatial frequency band. The second category includes continuous filters such as differential and other filters for effecting a linear transformation. However, light filtering techniques utilizing a single optical operation spatial filter requires a considerably increased discrimination ratio for identifying the input pattern and is unsatisfactory for determining characteristic parameters which are invariable with variation of the input patterns.

It is possible to compensate for these disadvantages by checking or detecting a plurality of characteristic parameters in order to recognize the input pattern. In order to obtain these characteristic parameters a number of identical pattern images are first formed from a single input pattern and then the optical information corresponding to each pattern image is associated with a different optical operation spatial filter. There are several known ways in which the optical information are placed in association with a plurality of spatial filters. The simplest method involves applying a plurality of filters with different characteristics sequentially to a given input pattern in order to determine their respective transmission outputs as observation parameters. This method, however, is not capable of processing the input pattern information simultaneously.

Another known method allows the simultaneous processing of the input pattern information to be carried out, this latter method involving the use of an optical system which operates to form a plurality of identical images or their Fourier-transform spectrum from an input pattern. A different filter is applied to each image or Fourier-transform spectrum. With this type of procedure, however, the optical path of each image-forming system must be separated from the other optical paths, so that an extremely complex optical system with a very bright light source is required.

SUMMARY OF THE INVENTION

It is accordingly a primary object of the present invention to provide an optical reader, and in particular a method and apparatus for manufacturing a spatial filter to be used in the optical reader, so as to be capable of providing a simple pattern recognizing apparatus which is economical, compact, and which is capable of operating at high speed.

In particular it is an object of the present invention to provide a spatial fileter capable of being used with other optical reader structure in such a way that a relatively large number of diffraction images can be derived from an input pattern with the number of diffraction images being formed simultaneously and being detected simultaneously.

Thus, the apparatus of the present invention is characterized by a single optical operation spatial filter which, in connection with a coherent light filtering method for extracting the characteristics of a two-dimensional pattern, carries out a plurality of filtering operations simultaneously for a single input pattern in order to obtain an increased discrimination ratio for identifying the input pattern.

One of the important features of the present invention resides in the provision of a point hologram which forms a spatial filter for the optical reader. This point hologram is manufactured by way of an interference pattern resulting from the interference between light from a point light source and reference light, and this point hologram is capable of forming an image of the input pattern at an optical output surface by utilizing primary diffraction light in the regeneration stage. During manufacture of the point hologram, it is possible to expose a hologram dry plate a number of times with light from an object and the reference light whose incident angle is varied so as to be different for the different exposures, respectively, and the resulting point hologram will function as an element having a multiple-image forming function for reasons which are pointed out below.

A point hologram manufactured by exposing a dry plate only once with light from an object is referred to below as a single-point hologram. A point hologram manufactured by exposing a dry plate a number of times with light from an object is referred to below as a multiple-point hologram. In general a hologram is provided with a relatively large redundancy. It is therefore possible to arrange in spaced relation with respect to each other a plurality of point holograms on a single recording medium. The optical element which is manufactured in this way is referred to below as a composite point hologram made up of a number of point hologram units. Depending upon whether the point hologram unit is a single-point hologram or a multiple-point hologram, the resulting composite hologram may be referred to as a composite single-point hologram or a composite multiple-point hologram. In accordance with the invention such a multiple-point hologram or composite multiple-point hologram is utilized as a spatial filter means for recognizing two-dimensional input patterns.

Thus, the apparatus of the present invention includes an optical system capable of forming a Fraunhofer diffraction pattern from a two-dimensional input pattern at the spatial filter surface which in turn processes the Fourier-transform image of the input pattern. The optical information of the input pattern which has been processed in this way is then detected by a photosensitive means in order to extract the characteristics of the input pattern. The details of this latter technique are set forth below.

BRIEF DESCRIPTION OF DRAWINGS

The invention is illustrated by way of example in the accompanying drawings which form part of this application and in which:

FIG. 2 is a schematic illustration of an optical reader which includes the spatial filter manufactured as shown in FIG. 1;

FIG. 3 is an example of a Wolsch-Adamal matrix;

FIG. 4 illustrates how the Wolsch-Adamal matrix is transposed to a Wolsch function, FIG. 4 also showing an expansion formula of the Wolsch function in two-dimensional space;

FIG. 5 illustrates various spatial filters representing a Wolsch function in two-dimensional space, and more particularly FIG. 5 shows the configuration of various masks which may be used in the manufacture of a spatial filter according to the invention; and FIG. 6 is a schematic illustration of an optical reader utilizing a spatial filter in the form of a composite multiple-point hologram.

DESCRIPTION OF PREFERRED EMBODIMENTS

Figure 1:
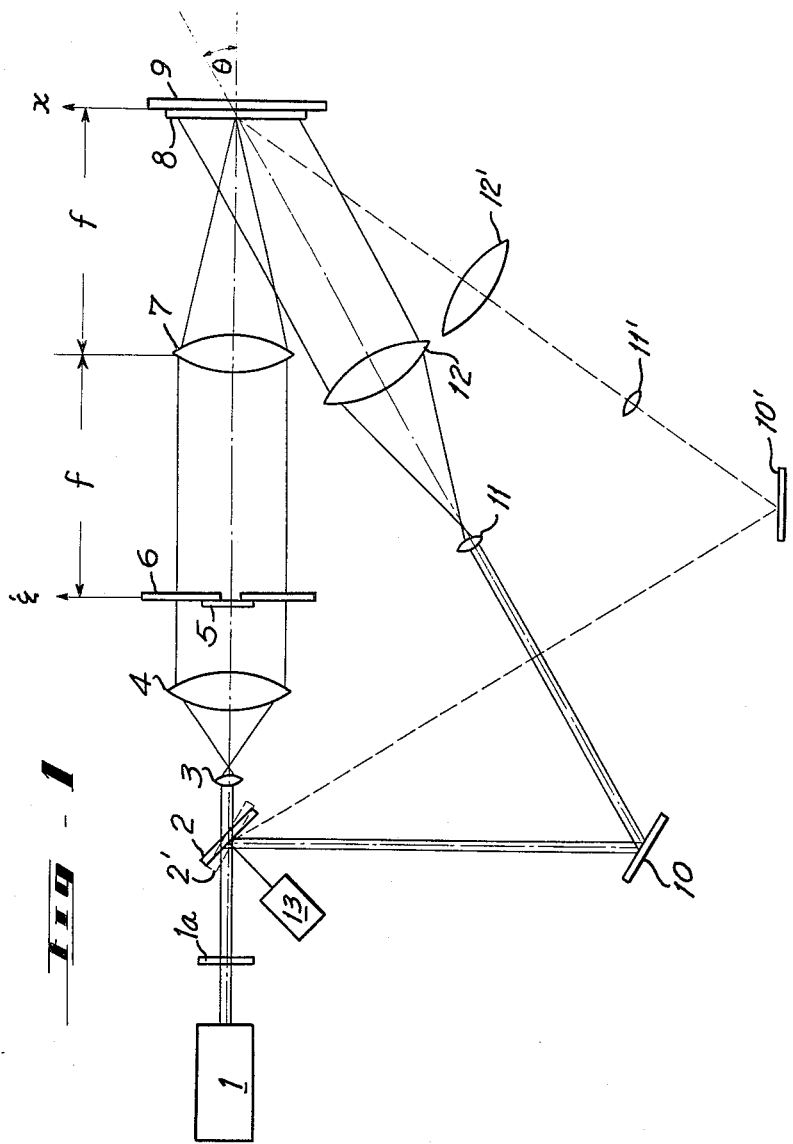
FIG. 1 schematically illustrates a method and apparatus of the invention for manufacturing a spatial filter.

Referring to FIG. 1, there is shown therein an optical system according to one embodiment of the invention for manufacturing a multiple-point hologram to be used as a spatial filter in an optical reader of the invention. At the left of FIG. 1 there is illustrated a coherent light source 1 which may be an $H_e - N_e$ laser (wavelength, 6,328Å). The light ray which is emitted from this coherent light source 1 passes through a suitable shutter 1a and reaches a semi-transparent reflector or mirror 2. As the light travels through and beyond the semi-transparent reflector 2 it is converted into an enlarged parallel light ray by passing through lenses 3 and 4 before illuminating a pinhole 6. If the laser ray is controlled so as to have a diameter smaller than that of the pinhole 6, lenses 3 and 4 may be omitted.

After the light ray travels along the optical axis beyond the pinhole 6 it reaches a lens 7 which serves to bring about a Fourier-transformation of the light ray into a distribution of light on a surface of a hologram dry plate 9 which is perpendicular to the optical axis. This light distribution represents the Fourier-transform spectrum of the pinhole 6.

That part of the light which is reflected by the semi-transparent reflector 2 impinges upon a reflector 10 which in this way provides reflected light to be utilized as a reference light. This reference light forms a light beam which is directed to the dry plate 9 simultaneously with the light beam travelling through the semi-transparent reflector 2, by way of an additional reflector 10. This reference light beam directed to the same point of the dry plate 9 which is reached by the light travelling through the semi-transparent reflector is converted into a parallel light ray by means of a pair of lenses 11 and 12, and this reflected light impinges on the dry plate surface at an angle $\theta$ with respect to the optical axis, or in other words with respect to the plane where the dry plate 9 is located.

Before reaching the surface of the hologram dry plate 9, the two beams of light which are simultaneously directed to a point on the dry plate surface are passed through a mask 8 which contacts the surface of dry plate 9 and which has a transmission function which will determine the transmission function of the optical operation spatial filter which will be formed by this point hologram.

After the dry plate 9 has been exposed in this way, one mask 8 is exchanged for another having a different transmission function. Then the dry plate is exposed a second time with the light which travels through the semi-transparent reflector along the optical axis simultaneously reaching the dry plate with the reference light which now is directed to the same point but at a different angle of incidence. This second exposure is then followed by a series of further exposures sequentially carried out for a number of times determined by the number of required filters, with the several filters used during the several exposures all being different and with the angle of the incident reference light all being different.

In order to change the angle of the reflected or reference light, the semi-transparent reflector 2 is turned by a drive unit 13, schematically illustrated in FIG. 1. Thus, after one exposure the semi-transparent reflector 2 may be turned from the solid line position to the dotted line position 2', and the light reflected by semi-transparent reflector 2 will travel along the light path indicated by the dotted line in FIG. 1, at this time. This reflected light which thus travels at a different angle is reflected by the reflector 10', representing the location to which the reflector 10 has been displaced for the second exposure, so as to provide in this way a parallel light ray, by utilizing the pair of lenses 11' and 12', and of course at this second exposure the incident light will impinge on the dry plate at a different angle. In this way it is possible to vary the angle of the reference light with rotation of the semi-transparent reflector as well as with displacement of the reflector 10 and the pair of lenses 11 and 12.

When the hologram dry plate 9 which has been exposed in this way is subsequently developed, a multiple-point hologram capable of being used as a spatial filter in the optical reader is achieved.

If during the manufacture of a point hologram in the above manner a diffuser in the form of a diffusion plate 5 is situated in contact with the pinhole 6, then a diffused-point hologram is achieved, with certain advantages referred to below.

The transmission coefficient of the thusly manufactured multiple-point hologram could be determined in the following manner: If the transmission coefficient of the pinhole 6 should be expressed by $t(\xi)$, the reference plane wave by $A\exp(-jkx \sin \theta_i)$ and the amplitude transmission function of the mask 8 by $W_i(x)$ ($i = 1, 2, \ldots, N$), then the light intensity distribution $I(x)$ on the dry plate surface obtained after having exposed the dry plate for N times would be expressed by, $$I(x) = \sum_{i=1}^{N} \left\{ W_i^2(x) \left[ N(A^2 + |F\{t(\xi)\}|^2) \right. \right.$$
$$+ AF\{t(\xi)\}\exp(jkx \sin\theta_i)$$
$$\left.\left. + AF\{t(\xi)\}\exp(-jkx \sin\theta_i) \right] \right\} \quad (1)$$

And the transmission coefficient $\tau(x)$ of the point hologram obtained would be expressed as, $$\tau(x) = \tau_b + \beta \sum_{i=1}^{N} \left\{ W_i^2(x) \left[ N(A^2 + |F\{t(\xi)\}|^2) \right. \right. \quad (2)$$
$$+ AF\{t(\xi)\}\exp(jkx \sin\theta_i)$$
$$\left.\left. + AF\{t(\xi)\}\exp(-jkx \sin\theta_i) \right] \right\}$$

where, $\xi$ is the coordinate of the pinhole surface, $x$ is the coordinate of the dry plate, $\theta$ is the incident angle of the reference light upon the dry plate, $k$ equals $2\pi/\lambda$, $\lambda$ is the wavelength of the light, $\tau_b$ is the bias transmission factor, $\beta$ is a constant and F is an operator for the Fourier transformation. For the convenience sake Formulas (1) and (2) are expressed so that they are adaptable to the one-dimensional patterns only.

In accordance with the invention, identification and recognition of two-dimensional patterns can be effected utilizing an optical reader provided with spatial filter means in the form of the above multiple-point hologram, as illustrated in FIG. 2. Thus, referring to FIG. 2, light from the coherent light source 14 is converted into an enlarged parallel light ray by utilizing a pair of lenses 15 and 16. Subsequent to these lenses along the optical axis there is a two-dimensional input pattern 17 having a pattern which is illuminated by the enlarged light ray. The light distribution of the two-dimensional input pattern 17 is then Fourier-transformed by a lens 18, thus forming a Fourier-transform spectrum of the input pattern on the back focal plane of lens 18. It will be noted that the input pattern 17 is situated in front of the lens 18 at a distance $f$ equal to the focal length thereof, while the spatial filter 19 in the form of the multiple-point hologram is situated behind the lens 18 at the distance $f$ equal to the focal length thereof. A plurality of photosensitive means are situated at the side of the spatial filter means 19 opposite from the optical means situated at the left thereof, as viewed in FIG. 2, in order to condense only the primary diffraction light issuing from the point hologram 19. The plurality of photosensitive means include a group of lenses 201, 202, . . . 20N, respectively situated along axes which coincide with the axes of the incident reference or reflected light rays utilized during the sequential exposures of the dry plate as described above, the condensing of the primary diffraction light being carried out at the respective focal planes of these lenses which are situated immediately behind the point hologram 19. The plurality of photosensitive detecting means which include these lenses also include along the same axes as those along which these lenses are located a plurality of photoelectric detectors 211, 212, . . . 21N. Thus, each of the photosensitive detecting means is arranged so that its optical axis coincides with the axis of the reference light previously applied at each exposure in order to manufacture the multiple-point hologram. The diffraction light intensity is transformed in this way into an electrical signal which is then used as a parameter for extracting the characteristics of the input pattern information, and the pattern identification is carried out by means of an electronic circuit which is not illustrated.

In the optical system of FIG. 2 if the transmission coefficient of the input pattern should be expressed as $S(\xi)$ ($\xi$ is the coordinate of the input pattern surface), then the incident light upon the point hologram 19 would be its Fourier transformation and expressed as F S($\xi$). Hence the quantity of light G(x) transmitting through the point hologram would be expressed by $$G(x) = \tau(x) \times F\{S(\xi)\}$$

A plurality of lens-and-photoelectric detector sets are arranged behind the point hologram in such a manner that the angle included between each of their optical axes and the main optical axis of this apparatus is coincident with the incident angle of each reference light applied to each exposure for making a point hologram, so that each of the photoelectric detectors detects the intensity of the primary diffraction light from the point hologram. If the amplitude of the primary diffraction light projected from the multiple-point hologram in the direction of $\theta_i$ should be expressed as $G_i(x)$ and if the photoelectric detectors are so designed as to detect the integrated total incident light, then the intensity of the received light $I_i$ would be expressed as $$I_i = \beta^2 A^2 \int_{-\infty}^{\infty} W_i^2(x) |F\{S(\xi)\}|^2 dx \ldots$$

(3)

It will be understood from Formula (3) that the light information of the Fourier-transform spectrum of the input pattern, which has passed through the mask of which light intensity transmission function is expressed as $W_i^2(x)$, is detected by a photoelectric detector arranged in the direction of $\theta_i$. It will therefore be appreciated that the point hologram manufactured in this manner serves as a spatial filter having a light intensity transmission function expressed by $W_i^2(x)$.

The configuration of the mask used during manufacture of the point hologram as described above determines the function of the resulting spatial filter means. The optical operation spatial filter can be manufactured in any form and, particularly, a multiple-point hologram could be used as a filter for carrying out orthogonal transformation processing of the input pattern information. Typical examples of such a filter include a Wolsch function expansion filter made up of a plurality of filters and a Fourier series expansion filter. The above feature of the multiple-point hologram of the invention forms one of the important advantages of the present invention in which one such multiple-point hologram is used.

Orthogonal transformation is a technique applicable to information processing in a simple and efficient manner. Several known techniques such as Fourier transformation and Wolsch-Adamal transformation are included in this category. However, in contrast with Fourier transformation which requires a multiplication to be carried out in an analog manner, the use of a filter of the orthogonal transformation type enables the processing of the information input to be carried out in a digital manner utilizing only addition and subtraction. As a result, the Wolsch-Adamal transformation which permits a higher processing speed has been receiving greater attention by people skilled in the art.

The above orthogonal transformation techniques were developed originally for use in an OCR where operations for extracting the characteristics of the input pattern were carried out only with an electronic computer. In order to achieve a simpler and more rapid operation, utilizing an optical means, the present invention provides for a light filtering technique utilizing a single multiple-point hologram which functions as a plurality of optical operation spatial filters.

The following description of a Wolsch-Adamal transformation is an example of a light filtering technique utilizing a plurality of optical operation spatial filters. The Wolsch-Adamal orthogonal transformation of an input pattern serves to express the input pattern information with a matrix, utilizing an already known Wolsch-Adamal matrix such as that illustrated in FIG. 3. In order to bring about such an orthogonal transformation on the Fourier-transform spectrum plane of the two-dimensional input pattern, an Adamal matrix is first transposed with four Wolsch functions $\phi_0, \ldots, \phi_3$, as indicated in FIG. 4 where the angular coordinate $\theta$ of the spectrum plane is taken as the abscissa. In this way an optical operation spatial filter having a Wolsch function is obtained. Generally, the Wolsch-Adamal matrix is defined as $$H_N = \begin{bmatrix} +H_{\frac{N}{2}} & +H_{\frac{N}{2}} \\ +H_{\frac{N}{2}} & -H_{\frac{N}{2}} \end{bmatrix} \begin{matrix} N = 2^n \\ n = 1, 2, \ldots \end{matrix} \quad (4)$$

FIGS. 3 and 4 represent the Wolsch functions ($n = 2$). The actual optical operation spatial filters — which are expressions of the Wolsch functions in two-dimensional space — are provided with a group of sectoral apertures $\phi_1, \ldots, \phi_7$ as illustrated in FIG. 5. Since the Wolsch function is a two-value function having a value of either 1 or 0, the blank areas shown in FIG. 5 are clear so that all of the light can pass therethrough, whereas the shaded areas are completely opaque and do not transmit any light. It is evident, therefore, that a multiple-point hologram manufactured as described above and utilizing masks having the construction shown in FIG. 5 will carry out the functions of a plurality of spatial filters of Wolsch type.

Thus, masks having the construction shown in FIG. 5 form part of the apparatus of the invention for manufacturing the spatial filter means. First the mask $\phi_1$ of FIG. 5 is placed in contact wiith the dry plate surface, as shown for the mask 8 in FIG. 1, and the dry plate is exposed while the reference light is applied at the angle $\theta_1$. Then for the second exposure the mask $\phi_1$ is replaced by the mask $\phi_2$ and the incident angle of the reference light is changed to $\theta_2$, so that the second exposure is carried out under these conditions. In the above manner the dry plate is sequentially exposed a number of times equalling the number of masks, with the reference light angle being changed at each exposure, so that in this way a multiple-point hologram is achieved. When the spatial filter means resulting from this multiple-point hologram is used as the spatial filter means 19 of FIG. 2, and with the input pattern situated as shown for the input pattern 17 of FIG. 2, a Fourier-transform spectrum of the input pattern will appear at the multiple-point hologram surface, and the $i$th photosensitive means whose optical axis coincides with the direction $\theta$ will detect the output image intensity $I_{ui}$, which is expressed as $$I_{ui} = C \int_{-\infty}^{\infty} \phi_i |F\{S(\mp)\}|^2 dx \ldots$$

(5)

where, $i = 1, 2, \ldots, 7$ and C is a constant. The output image intensity $I_{ui}$ is a quantized characteristic parameter obtained from the Wolsch-Adamal transformation of the input pattern information. It is to be understood that the diameter of the circular aperture of the masks employed in the optical system of FIG. 2 is great enough to cover the entire Fourier-transform spectrum of the input pattern. It is known that two-dimensional pattern recognizing techniques utilizing such spatial filters of the Wolsch function type are advantageous since it is possible to achieve a stabilized characteristic extraction irrespective of the parallel shift of the input pattern in its plane and irrespective of the enlargement or reduction of the input pattern.

In addition to the above-described Wolsch-Adamal function filters, other types of spatial filters have been devised. These include Fourier series expansion filters and modified Wolsch-Adamal function filters capable of effecting an orthogonal transformation. As pointed out above, any of these filters may be used for the spatial filter means of the present invention. This latter fact represents a further important feature of the pattern recognizing system of the invention.

As is apparent from the above description, although only a single optical element is utilized, the spatial filter means of the invention in the form of a multiple-point hologram provides an operation equivalent to that of a plurality of conventional spatial filters.

However, it is possible to utilize in accordance with the invention a further embodiment involving a composite multiple-point hologram as the spatial filter means.

The composite multiple-point hologram is made up of a number of unit point holograms regularly arranged with respect to each other on a hologram dry plate. Each of these unit point holograms is a multiple-point hologram memorized or stored in a relatively small area of the dry plate, this area being, for example, 1 cm². With this construction, a single composite multiple-point hologram enables a larger number of input pattern information bits to be processed, as compared with a single multiple-point hologram. Two methods may be used for manufacturing such a composite multiple-point hologram. According to one method, during the manufacture of the multiple-point hologram the optical axis of the optical means which provides the light ray issuing from the pinhole is displaced by shifting the pinhole in a stepwise manner in its own plane, each time through a predetermined constant distance along the two orthogonal coordinate axes $(\xi, \eta)$, so that the several unit multiple-point holograms are formed at positions on the dry plate which are illuminated by the light ray. In contrast, the second technique involves shifting the hologram dry plate in a stepwise manner in its own plane, while the pinhole and the mask remain stationary, so that in this way also a plurality of multiple-point holograms are formed on the dry plate at positions in alignment with the mask. This second method is more advantageous than the first in that it can be carried out with a much simpler optical system.

A composite multiple-point hologram as described above is capable of processing simultaneously and in a parallel manner a much larger number of two-dimensional input patterns than a single multiple-point hologram. It has been found, in particular, that the composite multiple-point hologram is capable of increasing the discrimination ratio for identifying the input pattern, as compared with a single multiple-point hologram, if the input pattern is decomposed into a plurality of elemental patterns referred to below as pattern elements, so that the Fourier-transform spectrum of each pattern element is formed at an associated hologram of the unit multiple-point holograms forming the composite multiple-point hologram and processed in the manner described above. This result is achieved because a given input pattern is detected in the form of a number of information bits which correspond to the number of pattern elements. This technique is described below with reference to a further embodiment of the invention which is illustrated in FIG. 6.

A known method for forming a multiple image may be used to divide an input pattern into a plurality of pattern elements. The multiple-image forming method involves dividing light into several portions by utilizing a semi-transparent reflector, as well as a second method according to which an optical element such as a multi-microlens, a multi-pinhole ray, or a point hologram are used. In the description which follows a method using a multi-microlens is referred to by way of example. FIG. 6 illustrates a two-dimensional optical reader utilizing a composite multiple-point hologram of the invention. Referring to FIG. 6, the light which is projected from the illustrated coherent light source 22 is enlarged and converted into parallel light by a pair of lenses 23 and 24, and the resulting light impinges on a multi-microlens 25 which in the illustrated example is provided with nine separate microlenses closely arranged in side-by-side relation in a common plane. Thus, while FIG. 6 illustrates three microlenses of the multi-microlens 25 situated one above the other, it is to be understood that each one of the illustrated microlenses is situated in a horizontal row of three of these microlenses. The light portions which are condensed at the back focal planes of these microlenses, situated at the focal distance $f$ to the right of the plane containing the microlenses 25 in FIG. 6, forms a plurality of point or secondary light sources the number of which is equal to the number of microlenses. Divergent light rays issue from these secondary light sources to be converted by the lens 26, situated at the focal distance $f$ from the secondary light sources, into parallel light rays, respectively, which illuminate the input pattern 27 situated at the distance $f$ rearwardly of the lens 26 in FIG. 6. The input pattern 27 is situated at the focal distance $f$ in front of a further lens 28 situated in front of a further multi-microlens 29 which may be identical with the multi-microlens 25 so that images of the input pattern 27 will be formed at the mask 30 situated at the focal distance $f$ to the rear of the multi-microlens 29. In this way a plurality of images of the input pattern, the number of which is equal to the number of microlenses, are formed at the mask 30 at positions in alignment with the plurality of secondary light sources. A matched filter selected from several types of matched filters is attached to the mask 30 at each input pattern image position so that the input pattern is divided into pattern elements. These matched filters may, for example be in the form of masks which will transmit only the required part of the light of the pattern element but not the remaining light thereof. Then the pattern elements of the input pattern are Fourier-transformed respectively by a further multi-microlens 31, which may be identical with the other multi-microlenses, so that the Fourier-transform spectra of the respective pattern elements are formed at the back focal plane of the multi-microlens 39, the spatial filter means 32 in the form of the composite multiple-point hologram being situated at this back focal plane. Thus, the multi-microlens 31 may include a plurality of microlenses the number arrangement and size of which are identical with those of the multi-microlens 25. The composite multi-point hologram 32 is arranged in such a way that each unit multi-point hologram included therein is in alignment with a Fourier-transform spectrum of each corresponding pattern element. In just the same way as described above in connection with the two-dimensional pattern reader utilizing a single multiple-point hologram, the output images are detected by a plurality of photosensitive means respectively including a plurality of lens groups (33$a$1, 33$a$2, . . . , 33$a$N; 33$b$1, 33$b$2, . . . , 33$b$N; 33$c$1, 33$c$2, . . . , 33$c$N) and a plurality of photoelectric detector groups (34$a$1, 34$a$2, . . . , 34$a$N; 34$b$1, 34$b$2, . . . , 34$b$N; 34$c$1, 34$c$2, . . . , 34$c$N). The character N represents a multiple-point hologram which is exposed N times and the characters $a, b, \ldots$ represent positions on the hologram surface corresponding to the respective pattern elements.

Thus, the above description illustrates how the characteristics of the input pattern are extracted as electrical signals. In accordance with this method, since the input pattern information bits are processed after having been decomposed into pattern elements, the number of output pattern information bits is increased, and thus it is possible to increase the discrimination ratio of the pattern identification as compared with a method utilizing a single multiple-point hologram, so that discrimination between similar patterns is facilitated.

Depending upon the particular characteristics of the multiple-point or composite multi-point hologram which serves as a spatial filter means with the structure of the invention, various features and advantages of the invention will become evident. Thus, in order to obtain a multiple-point hologram which will function as a spatial filter means, it is only required to place a plurality of masks having different filter functions into contact with a dry plate designed for forming the point hologram, and then by multiple-exposing the hologram dry plate with light from an object with varying incident angle of the reference light for each mask, it is possible to achieve in an extremely easy and highly effective manner a optical operation spatial filter capable of being used for the purposes of the present invention. Moreover, the light which reaches the mask and hologram dry plate can take the form of a point light source formed by way of a pinhole or the like.

Moreover, since a multi-point hologram has the function of forming a multiple image of a two-dimensional input pattern, it can perform, when used as a spatial filter means, a plurality of filtering operations simultaneously and in parallel with each other. This technique brings about elimination of troublesome operations in connection with exchanging filters as I required with conventional procedures, and in addition it is possible to perform a real time processing of the two-dimensional input pattern information bits. With previously known techniques, each of the image-forming systems is provided with a separate optical path to form a multiple image so as to bring about a simultaneous processing in one operation. In contrast, with the features of the present invention it is sufficient to provide a single optical path in the optical system for each input pattern, and a single multiple-point hologram is capable of fulfilling a plurality of filtering operations simultaneously and in parallel with each other in the same way that is possible with previously known techniques but with far more complex procedures and structures. It is thus possible to minimize with the present invention the size of the optical apparatus which is used.

Of course, all of the above advantages and features relate to a multiple-point hologram. However, a composite multi-point hologram, as described above, provides additional advantages in connection with enabling simultaneous and parallel filtering operations in connection with a plurality of two-dimensional input patterns. Particularly when the input patterns are broken down into pattern elements resulting from decomposing single two-dimensional input pattern the output pattern information will contain an increased number of bits. It is therefore possible to increase the discrimination ratio for identifying the pattern as compared with procedures utilizing a single multi-point hologram.

Furthermore, by utilizing a diffuser such as the diffusion plate 5 shown extending across pinhole 6 in FIG. 1, several additional advantages are achieved. The diffuse-point hologram has an increased redundancy as compared with an ordinary point hologram and has an almost uniform diffraction efficiency over its entire area. Furthermore, the diffuse-point hologram is made by directing to a dry plate a light which has a reduced intensity differential as compared with the incident light used in making a conventional point hologram. Thus, application of light having a narrower dynamic range is advantageous in that the resulting diffuse-point hologram will be capable of achieving a linear recording of a light.

Thus, with the invention it becomes possible by simple exchange of a plurality of masks having characteristics equal to the transmission function of the desired spatial filter means, namely by placing these masks in contact with a dry plate, to achieve a multiple-point hologram in an extremely easy and inexpensive manner, with the resulting hologram capable of operating to bring about the desired functions. Therefore, with the pattern recognition features of the present invention utilization of a point hologram is applicable to the various methods for extracting the characteristics of the pattern.

A multiple-point hologram is capable of carrying out a plurality of filtering operations with respect to the input pattern simultaneously and in parallel with each other, as pointed out above, so that it is possible with the features of the present invention to process two-dimensional pattern information at a much higher speed than is possible with the sequential operations necessary with an electric computer associated with an OCR.

As may be seen from FIGS. 2 and 6, the structure required for operational processing of the two-dimensional input pattern information is compact and economical requiring only a simple optical system.

In addition to all of the above features and advantages derived from a multiple-point hologram, a single composite multi-point hologram in accordance with the present invention provides even more advantages in that it enables filtering of a large quantity of two-dimensional input patterns simultaneously and in parallel with each other, particularly in the case where the input patterns are in the form of pattern elements an increased number of information bits can be detected on the optical input surface and thus the extraction of the pattern characteristics will have an increased discrimination ratio and can be brought about at a higher speed, as compared with features in connection with a single multiple-point hologram.

With respect to the diffusion feature as referred to above, because of the high redundancy and uniform diffraction efficiency over the entire surface, a diffuse-point hologram provides at any point thereof a diffraction light having an intensity which is proportional to the intensity of the input light, thus permitting the extraction of the input pattern characteristics with a reduced error.

Thus, the patttern recognizing optical apparatus of the present invention, incorporating a multiple-point hologram or a composite multi-point hologram as an optical operation spatial filter, it is capable of performing in a simple rapid manner extremely complex operations which conventionally have required the use of an electronic computer associated with an OCR. This great advantage of the present invention results from the fact that with the features of the invention it is possible to simultaneously carry out processing of the input information in the two-dimensional space. With prior art light filtering methods, extreme complications were encountered in that it was essential to provide a plurality of filtering operations in order to extract a plurality of parameters. It is therefore apparent that with the present invention this disadvantage is eliminated and it is possible to provide a pattern recognizing apparatus which is easy to operate and which contributes greatly to the magnification of the practical application field of the OCR.

What is claimed is:

1. In an optical reader, optical means for directing light through an input pattern extending across an optical axis of said optical means and for providing an input pattern spectrum of the input pattern at a given plane, spatial filter means situated at said plane for providing a diffraction image corresponding to the input pattern, said spatial filter means being in the form of a hologram which has been exposed at a point which receives the input pattern spectrum to a pair of intersecting light beams one of which extends along the optical axis and the other of which is at a predetermined angle with respect to said axis with the light beams passing through a mask contacting the surface of the hologram prior to development thereof and having a transmission function which determines the transmission function of the spatial filter means formed by the hologram, and photosensitive detecting means situated at the side of said spatial filter means opposite from said optical means along an axis extending at said predetermined angle through the point of the hologram exposed to said light beams for responding to the diffraction image to provide a signal capable of identifying the input pattern, said hologram which forms the spatial filter means having been exposed at said point sequentially not only to a light beam extending along the optical axis but also to a plurality of light beams respectively extending at different angles with different masks being used to provide different transmission functions so that the spatial filter means has a plurality of different transmission functions respectively extending along a plurality of axes corresponding to the angles of the light beams which extend across the optical axis at a point of the hologram which is exposed prior to development thereof, and a plurality of said photosensitive means respectively situated along said axes at said different angles for responding to diffraction images extending along said axes to identify the input pattern.

2. The combination of claim 1 and wherein the spatial filter means has a plurality of points where the hologram forming the spatial filter means has been preliminarily exposed to light beams at different angles and masks with different transmission functions, a plurality of said photosensitive means being situated along of the axes corresponding to the light beams which extend at an angle to the optical axis at the several points for detecting a plurality of diffraction images and responding thereto to identify a pattern, and said optical means including means situated along the optical axis for dividing the input pattern into a plurality of elements to achieve multiple images directed to the several points of the hologram.

3. The combination of claim 2 and wherein said means for dividing the input pattern includes a plurality of microlenses.

4. The combination of claim 3 and wherein a plurality of the means for dividing the image up into elements are situated along the optical axis with lenses situated therebetween and with the last two of the means for dividing up the image which are situated before the spatial filter means defining a space along the optical axis between themselves, and a mask situated in said space for forming images of the input pattern.

5. The combination of claim 4 and wherein each of said plurality of means for dividing the image up into elements is in the form of a plurality of microlenses situated in side-by-side relation in a common plane.

6. The combination of claim 1 and wherein said spatial filter means carries out an orthogonal transformation processing of the input pattern.

7. The combination of claim 1 and wherein said spatial filter means is in the form of a hologram initially exposed to light which travels through a diffuser along the optical axis.

* * * * *